United States Patent
Chang (10) Patent No.: US 7,636,130 B2
(45) Date of Patent: Dec. 22, 2009

(54) TELEVISION WITH AUTOMATIC INPUT SWITCHING

(76) Inventor: Darwin Chang, 10779 Juniper Ct., Cupertino, CA (US) 95014

( * ) Notice: Subject to any disclaimer, the term of this patent is extended or adjusted under 35 U.S.C. 154(b) by 470 days.

(21) Appl. No.: 10/965,337

(22) Filed: Oct. 14, 2004

(65) Prior Publication Data

US 2006/0221254 A1 Oct. 5, 2006

Related U.S. Application Data

(60) Provisional application No. 60/513,350, filed on Oct. 22, 2003.

(51) Int. Cl.
*H04N 5/268* (2006.01)

(52) U.S. Cl. ............... 348/706; 348/553; 348/558; 348/705

(58) Field of Classification Search ........... 348/705, 348/730, 553, 554, 555, 558, 564–565, 569, 348/706; *H04N 5/268*
See application file for complete search history.

(56) References Cited

U.S. PATENT DOCUMENTS

| | | | |
|---|---|---|---|
| 4,660,084 A | 4/1987 | Filliman | |
| 4,996,597 A | 2/1991 | Duffield | |
| 5,161,019 A | 11/1992 | Emanuel | |
| 5,253,044 A | 10/1993 | Lamy | |
| 5,305,105 A | 4/1994 | Heo | |
| 5,432,561 A | 7/1995 | Strubbe | |
| 5,438,375 A | 8/1995 | Sasabe | |
| 5,565,929 A | 10/1996 | Tanaka | |
| 5,572,263 A | 11/1996 | Kim | |
| 5,640,484 A | 6/1997 | Mankovitz | |
| 6,473,135 B1 | 10/2002 | Iwamura | |
| 6,490,009 B1 | 12/2002 | Asakura | |
| 6,591,314 B1 | 7/2003 | Colbath | |
| 6,593,975 B1 | 7/2003 | Oh | |
| 6,597,782 B1 | 7/2003 | Marcoux | |
| 6,757,025 B1 | 6/2004 | Takano | |
| 6,864,891 B2 * | 3/2005 | Myers | 345/502 |
| 2002/0057378 A1 | 5/2002 | Yang | |

* cited by examiner

*Primary Examiner*—Trang U Tran
(74) *Attorney, Agent, or Firm*—Kleinberg & Lerner, LLP; Marvin H. Kleinberg (57) ABSTRACT

A video display device having an automatic input switching capability includes at least one input connector coupled to the video display device for accepting an external video signal, sensing means coupled to the at least one input connector for detecting the presence of the external video signal; control means coupled to the sensing means and video circuitry of the video display device, wherein the control means controls the operation of the video display device when a new video signal is sensed by the sensing means.

13 Claims, 6 Drawing Sheets

TELEVISION WITH AUTOMATIC INPUT SWITCHING

This patent application is a continuation in part of U.S. provisional patent application Ser. No. 60/513,350 filed Oct. 22, 2003.

FIELD OF THE INVENTION

The present invention relates to an audiovisual devices, and more particularly to a television which will automatically switch to an active input signal.

BACKGROUND

Modern televisions are typically able to connect to a number of different devices which provide a source of video signals. These video sources can include DVD players, VHS cassette players, satellite television receivers, game consoles, computer video signals and a whole host of other types of devices. These sources are usually connected to the television by cables that mate with connectors on the television.

The presence of multiple video input devices leads to complications when the user of the television desires to use one of them. For example, a person who desires to watch a DVD movie on a television is required to properly configure the television in order to view the movie. Typically, the user must turn on the television, and then select the appropriate video input signal. Although this task may seem simple enough, it can be difficult for many to people to accomplish. For example, small children or for persons who are not technically inclined may not be able to complete the task without undue confusion. In addition, users who do not frequently use different video sources may not be familiar with the process required to select among different input signals.

Typically, a television will label the input video signals from the different devices as VIDEO1, VIDEO2, VIDEO3 and so forth. The user will typically select between different video signals using a TV/VIDEO switch on the television (or associated remote control device). The user of the television must be able to recall which video signal corresponds to which device. If the user cannot recall which signal corresponds to the desired device, then all of the input signals must be checked in order to determine the correct signal.

It is therefore an object of the present invention to provide a television which incorporates suitable sensing circuits to automatically detect when an input signal becomes active.

It is a further object of the present invention to provide a television which will automatically switch to display an active video signal.

It is a further object of the present invention to provide a television which can automatically detect and select from a number of different video inputs.

It is a further object of the present invention to provide a means for displaying an active video signal on a television which is coupled to a plurality of input devices with a minimum of user effort.

SUMMARY OF THE INVENTION

The present invention overcomes the prior art by providing a television or other video display device which will automatically detect and sense the presence of an active video signal on a video input connector. The television includes at least one input connector for accepting an external video signal, sensing means coupled to the input connector for detecting the presence of an external video signal, control means coupled to the sensing means and a video circuitry of the television, wherein the control means controls the operation of the television when a new video signal is sensed by the sensing means. The technology of this invention may also be implemented as a standalone device for use with a television or as an automatic audio-selection device.

DETAILED DESCRIPTION OF THE INVENTION

A television with an automatic input sensing and switching is described. In the following description, specific components and circuitry, such and the control and sensing circuits are described in detail in order to give a more thorough understanding of the present invention. In other instances, well known components, such as the television video circuitry are not described in detail so as to not obscure the present invention unnecessarily.

Figure 1:
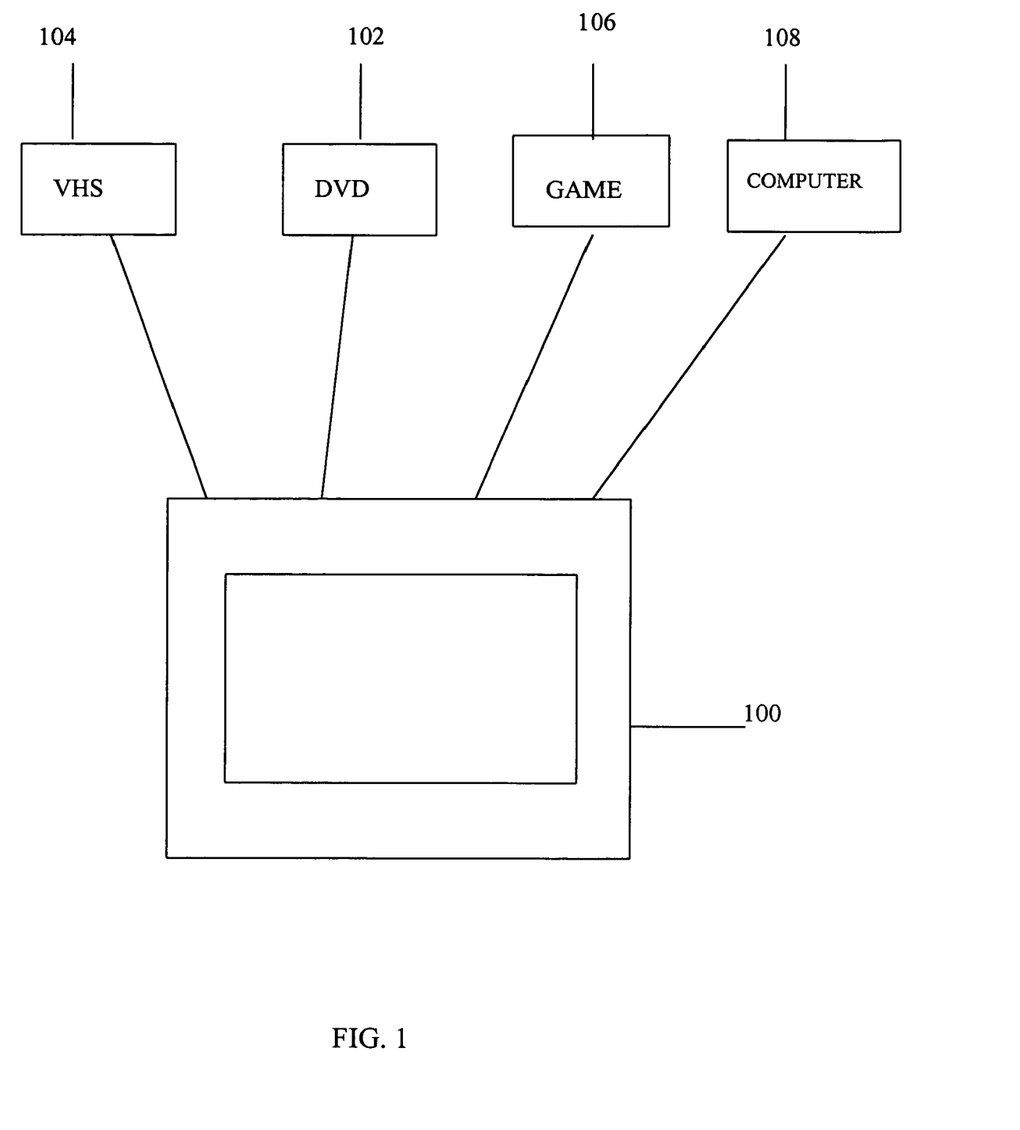
FIG. 1 illustrates a representative television attached to a number of different video sources.

Referring first to FIG. 1, a representative illustration of a television 100 connected to a number of different video sources is shown. In the example of FIG. 1, the television 100 is shown connected to a DVD player 102, a VHS cassette player 104, a game console 106 and a computer system 108. It will be understood that the video sources in the example of FIG. 1 are not the only types of devices which may be coupled to a television.

The video sources may be connected to the television using many different video signal formats. For example, the video source can be coupled using a standard coaxial cable. Alternative connection means include S-Video and component video (Y, $P_b$, Pr) cables. The present invention is not limited to a particular connection means. Instead it is intended to cover any means of connecting a video input device to a television.

Figure 2:
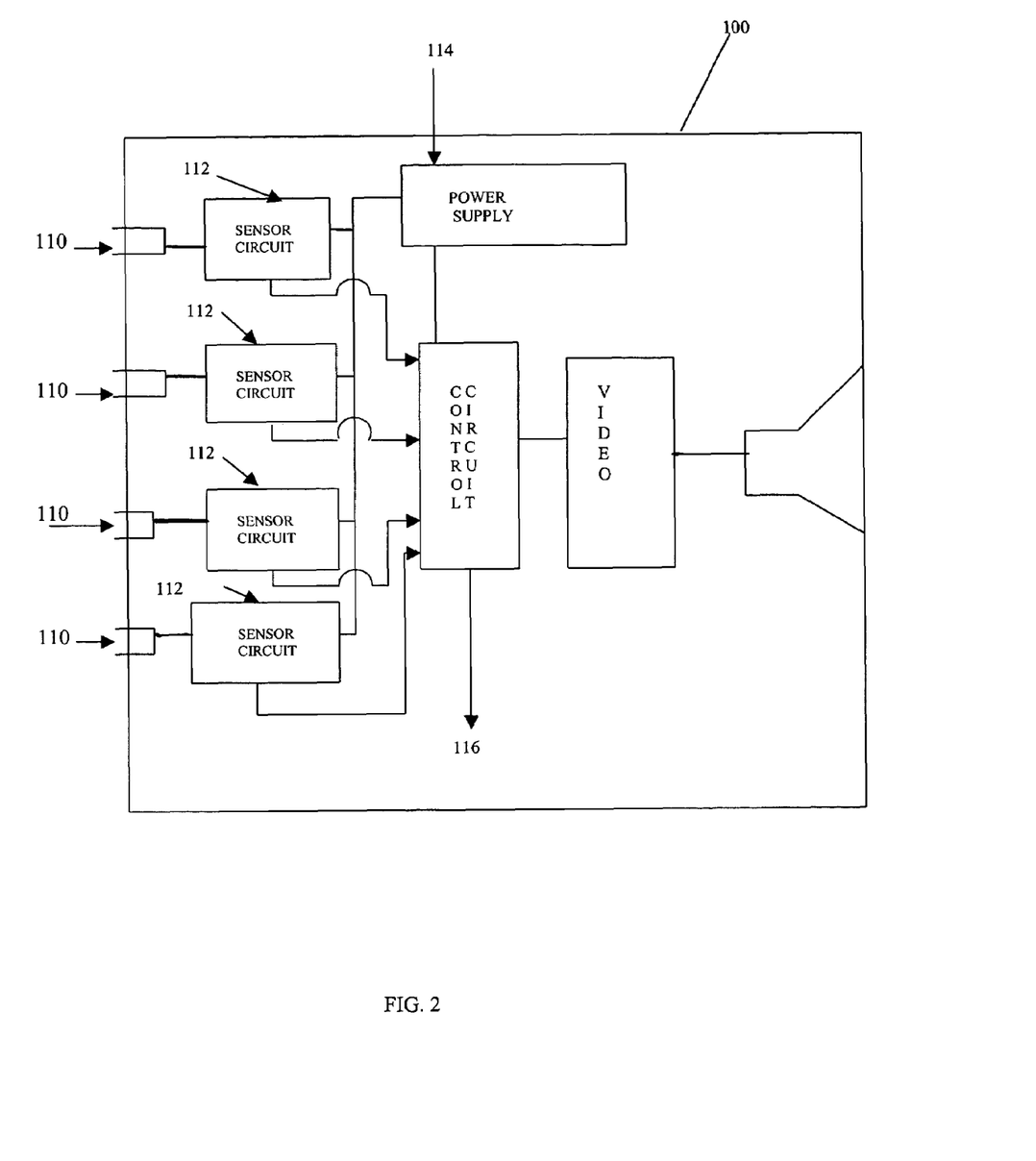
FIG. 2 is a block diagram of the major components of the television of the present invention.

Referring next to FIG. 2, a block diagram of the major components of the present invention are shown. The television 100 includes a plurality of input connectors 110 for the video signals. Each input connector 110 is coupled to a sensing circuit 112. FIG. 2 illustrates a total of four input connectors 110 and sensing circuits 112. It will be appreciated by those of skill in the art that a larger or smaller number of such elements may be incorporated, depending on the number of video input connectors available on the television.

Each sensing circuit 112 is connected to a control circuit 116. In the preferred embodiment, there is only one control circuit 116. In alternative embodiments, there may be multiple control circuits 116. The control circuit 116 is responsible for receiving date from the sensing circuits 112 and, using computer logic, determining which video input source to connect to the television output.

FIG. 2 illustrates a separate sensing circuit for each video input signal. In an alternative embodiment of the invention, there is only one sensing circuit which is coupled to each of the input signals by means of a multiplexer or other suitable circuitry. In this alternative embodiment, the single sensing circuit would be responsible for determining which video input was receiving a signal and passing this information along to the control circuit 116 for action. The single sensing circuit in the alternative embodiment will, in the preferred embodiment, sequentially sample the signal on each set of input connectors. Other sampling schemes, such as a random sampling or a weighted input method can be used with equal effectiveness.

Some televisions already include a microprocessor as part of their existing circuitry. In such cases, the control circuit 116 may be implemented in software which is run on the microprocessor. In this embodiment, the sensing circuits 112 would still be required to perform the functions of determining when a new video input source has begun. In another alternative embodiment, the circuitry of the sensing circuits 112 and the control circuit 116 may be implemented through suitable television hardware configurations and the inclusion of software programmed to perform the sensing circuits 112 and control circuit 116 functionality on the already included microprocessor.

In the preferred embodiment, both the sensing circuits 112 and the control circuit 116 are "always on" circuits. That is, they are powered even when the television is turned off. As shown in FIG. 2, the sensing circuits 112 and control circuit 116 are connected directly to the power supply 114 of the television 100. In an alternative embodiment, the sending circuits 112 and control circuits 116 can be turned off and activated by an external mechanism, such as a user or other control circuit (not illustrated).

The functionality of the present invention is readily understood through the description of a specific example. Consider the case when a user desires to watch a movie that is recorded on a DVD. The DVD is coupled to the television by means of a suitable cable (as discussed above) which are connected to a set of input connectors. The user will insert the DVD into the player and press the "Play" button to start (some DVD players do not require a user to press the Play button).

The sensing circuit 112 that is coupled to the connector for the DVD player will recognize the presence of a new video signal being transmitted by the DVD player even with the presence of one or more other pre-existing video sources such as a VCR or game console that are currently providing a video signal to the input connectors on the television. The sensing circuit performs this function by monitoring the transition from "no signal" to a new signal on the input connector. The control circuit 116 will understand that the presence of the new signal indicates that the DVD player has been turned on. The control circuit 116 will then determine if the television is turned on or off. If off, the control circuit 116 will automatically turn on the television without further input from the user. The control circuit 116 will then select the appropriate video input for display. In this manner, the DVD movie can be viewed with a minimum amount of actions on the part of the viewer.

Figure 3:
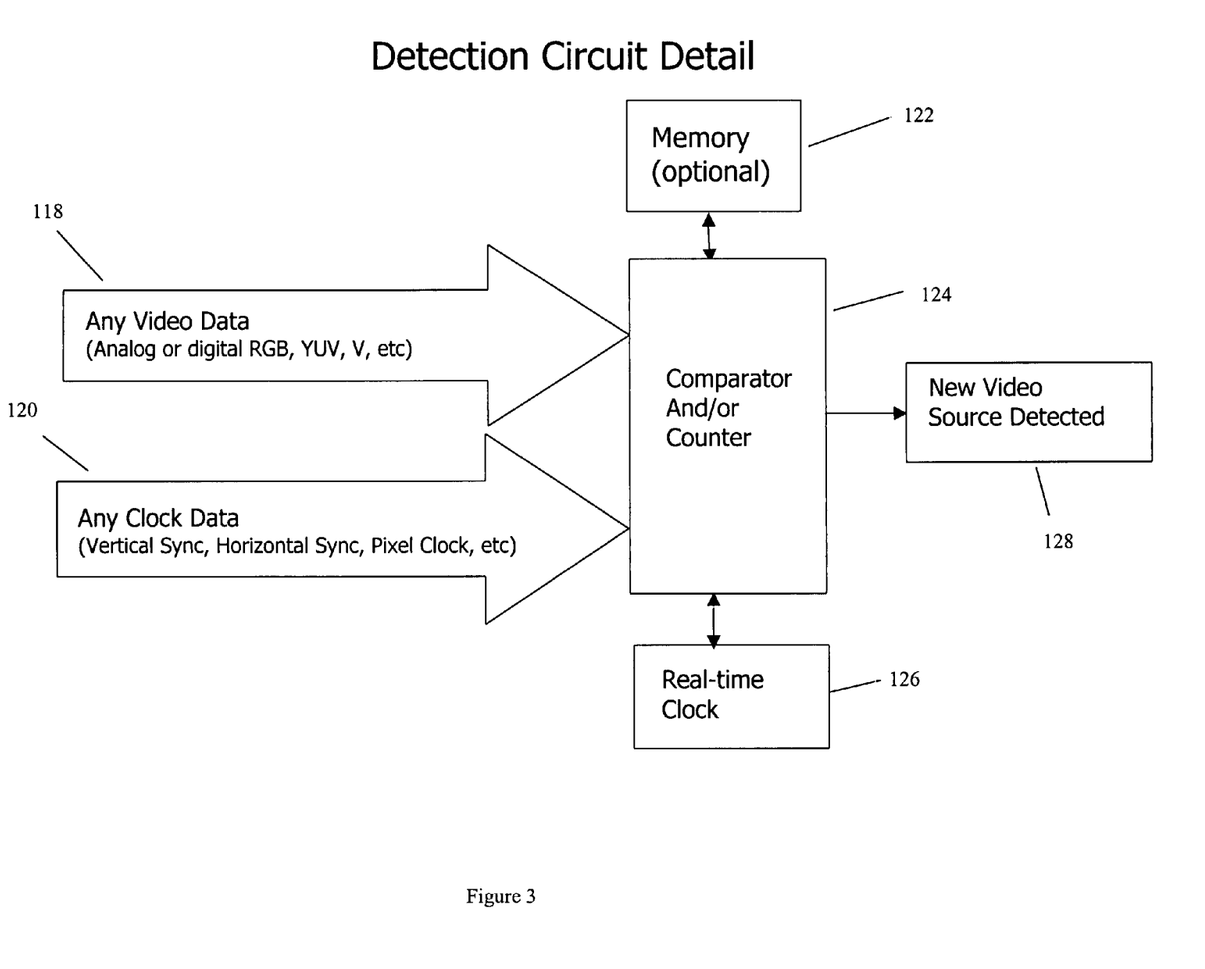
FIG. 3 is a block diagram illustrating the major components of the detection circuit.

In the preferred embodiment, the new video signal is detected by one of two methods, though other methods may be used. Referring now to FIGS. 2 and 3, the first method involves the sensing circuit 112 monitoring the video signal for consistency. Should the video signal remain constant, static and unchanged for a period of time, then this state is defined as a non-video data state. Using the non-video data state as a base, the sensing circuit 112 monitors for any new video data 118. Any change from the relatively static non-video data state is interpreted as a new video data source 128. This information is passed along to the comparator and counter 124 which in turn passes the information concerning the new video data source 128 on to the control circuit 116.

The second method involves the sensing circuit 112 monitoring the input for any changes in clock data. In order to display an image properly, the television uses vertical and horizontal synchronization data. In more modern televisions and flat-screen displays, individual pixel data is sent. This data is used in properly displaying and timing the images. Using the vertical or horizontal synchronization data or the individual pixel clock, the sensing circuit 112 assigned to monitor a particular input connector 110 will pass along that a new video data source has been detected when changes occur. For example, if a video signal is not present on the video connector, then the vertical synchronization signal will have a value that is below approximately 10 Hz for a standard NTSC signal. If the vertical sync signal rises from below the threshold value of approximately 10 Hz, this information is passed along to the comparator 123 and counter 124 and a new video data source is found. This information is then passed along as a new video data source to the control circuit 116. It will be apparent to those of skill in the art that the vertical sync signal may have different threshold values for different types of video signals. The comparator 123 and/or the counter 124 can be programmed to recognize a different threshold value.

The memory 122 may be used to store data relating to when new video data sources have been found and the length of time since a change has occurred in a particular input connector 110 for use in determining when a new video data source 128 is present. A real-time clock 126 is also included to keep track of the amount of time between changes in video data information. The real-time clock 126 is useful in measuring the distances between changes, to determine if there is a new video data source 128 or simply a continued video source.

Figure 4:
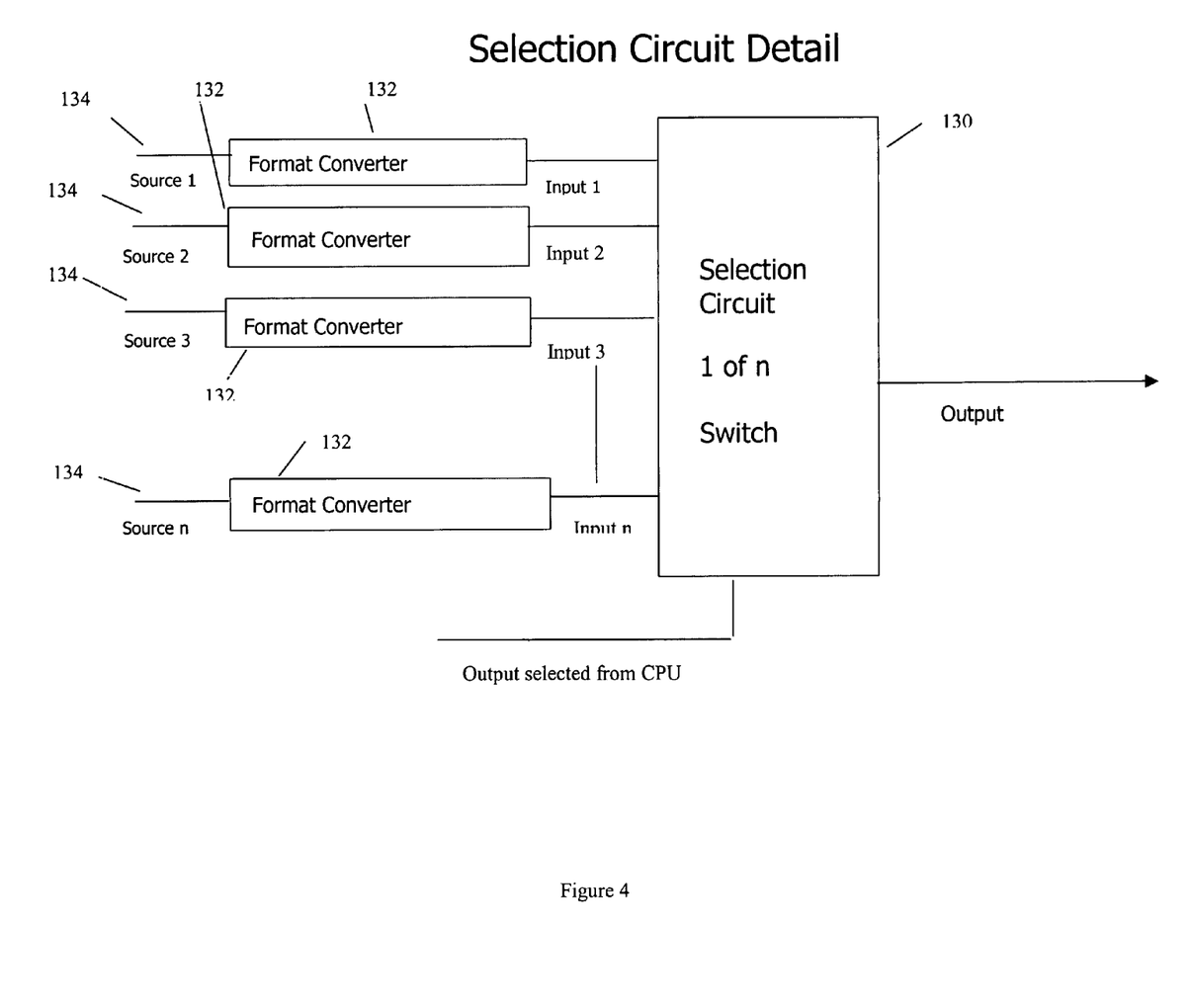
FIG. 4 is a block diagram illustrating the major components of the selection circuit.

Referring next to FIG. 4, the selection circuitry which, in the preferred embodiment is contained within the control circuit 116, is depicted. Once a new video data source 128 has been detected, the control circuit 116, based on logic embodied in software resident in the control circuit 116, will pass along instructions to the selection circuit switch 130 to choose the appropriate input connector 110. The selection circuit switch is equipped with the capability of choosing any one of the input connectors 110 from which to receive a video data signal. Software resident in the control circuit 116 also will enable a user to select not to automatically switch, but to bring up the newest video input in a picture-in-picture display and then to choose whether or not to switch to the new video source using the remote or through some other means.

In the preferred embodiment, the selection circuitry also includes a format converter 132 for each of the input sources 134. These format converters 132 are designed to convert a variety of signals, including NTSC and ATSC, into appropriate signaling for the display. Alternatively, the format converter 132 may be equipped with the capability to automatically scale and transform a variety of aspect ratios, including 4:3, widescreen and letterbox, based on the type of input signal detected. The audio adjustments such as volume can also be automatically adjusted based on the input to maintain consistent balance between the sources. This may be necessary to maintain consistency because DVD and ATSC have a more dynamic audio range than the NTSC format. Once the selection circuitry switches to the desired input connector 110, control is passed back to the control circuit 116.

Figure 5:
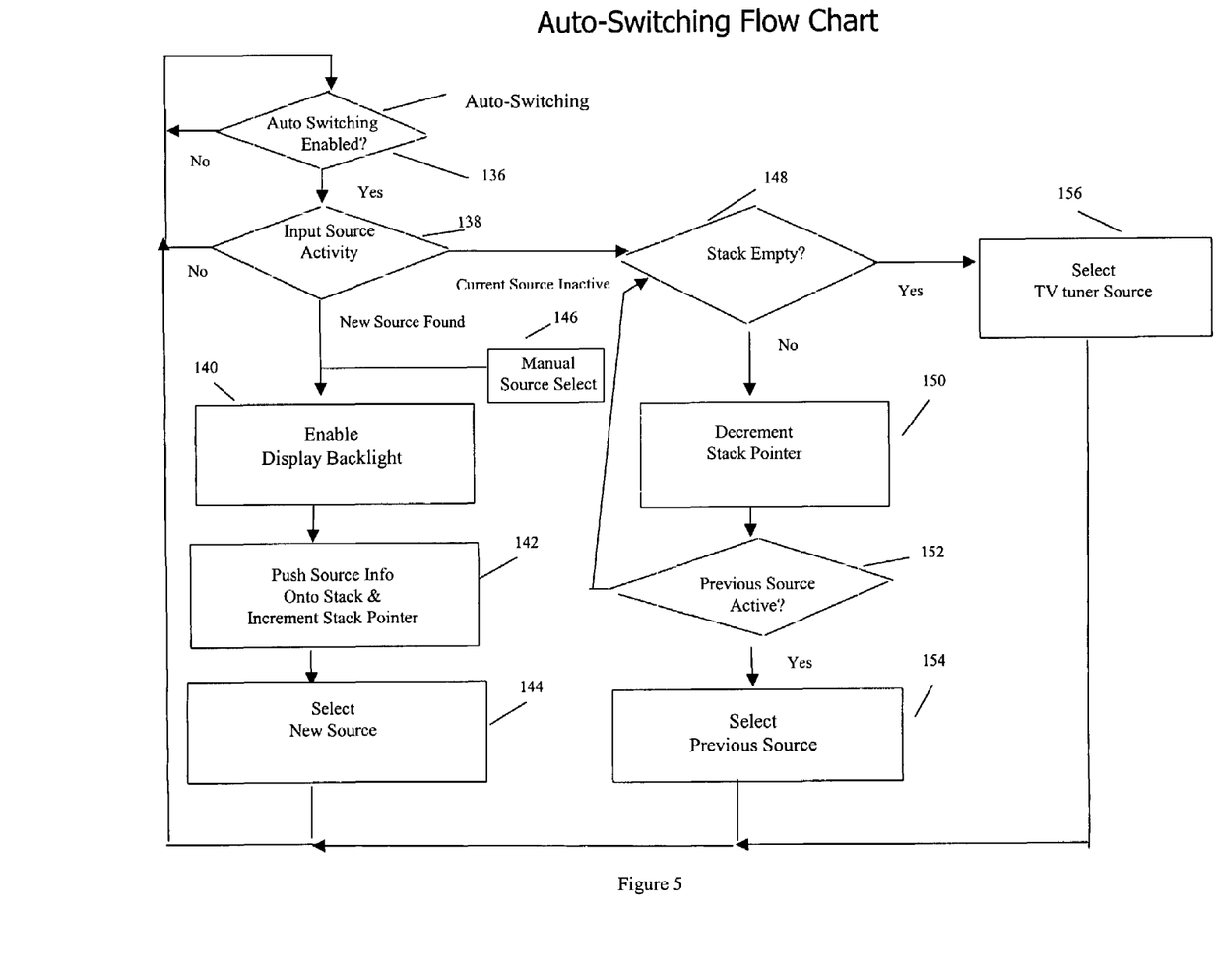
FIG. 5 is a flowchart illustrating the major steps followed in the process of the present invention.

Referring next to FIG. 5, a flowchart of the logical operation of a television with automatic switching is depicted. The first step in the process tests to see whether the auto-source function is enabled 136. This is essentially a Boolean test to determine if the auto-source switching is enabled on the television. If it is not enabled, then the television will not react to new video data sources at all and will continue in the current state. For example, with this option disabled, when the user inserts a DVD, the television, if in the off position, will not continue down the flowchart to turn itself on and will not switch to the proper input. However, with this option enabled, the flowchart will continue. The next step is for the sensing circuits 112 (See FIG. 2) to determine that there is new or current input source activity 138. If there is no new or current input source activity 138, then nothing happens. The sensing circuits do not only determine new input sources, but also a lack of activity on current sources. So, for example, if the current source that the television is using suddenly stops transmitting video data, as in when a user turns off the DVD player at the completion of a movie, the television will move on to check to determine whether the stack of video sources is empty 148. Appropriate logic is incorporated to smooth potential "bumps" in the data to avoid false signaling or signal switching. In this way, temporary loss or change of synchronization or data information is not misconstrued as an indication of video source being turned on or off. For example the frame-rate in the standard NTSC signal is 33 ms. That is sufficient time to re-check and confirm that a state change has occurred without appearing as a delay to the user. That is not to say that the invention is limited to use only with that specific frame rate, or with the NTSC signal. Other frame rates having different periods can be used with the overall scope of the present invention, as will be apparent to those of skill in the art. The stack, as used herein, is not the actual memory location stack of a traditional computer system. This stack is actually an implementation of a similar data structure whereby video source data is retained to enable the television to automatically switch back to the immediately prior video source once a newer source has stopped transmitting video signal.

Referring again to FIG. 5, if there is a new input source found, the next step is to enable the television display's backlight 140 (in the case of liquid crystal displays). This step may simply activate the television's display in the traditional tube-based television. The next step in switching to the new source is to push the current source information onto the stack of video sources and to increment the stack pointer. This will retain the prior source information for later use. The final step in automatically switching to a new video source is to select the new source and to begin displaying the contents of that source. In this manner, the television automatically displays the new video content without any further action or input from the user.

In an alternative embodiment, the user may be given the option to manually determine whether or not the new video display should be displayed. This option is illustrated as a manual source select step 146 in FIG. 5. In this alternative embodiment, the user is asked whether or not to switch input sources if one is currently being displayed.

The stack is tested to determine if it is empty 148 after a determination is made by the sensing circuits 112 and the control circuit 116 that the current source is inactive. This test is most easily implemented by using the stack pointer. If the stack pointer is not in its default start position, then there is something remaining in the stack and thus there was a prior video source. If the stack is not empty, this means that there was a source being viewed when the television last switched sources.

In the case that the stack is not empty, the stack pointer is decremented 150 and a further test is made by the sensing circuits 112 to determine if that source is still active 152, such as a video game console still transmitting video data. If the source is not active, then the source is not switched to that source, and the test to determine if the stack is empty 148 is repeated, potentially with a now-empty stack. Otherwise, if the sensing circuits 112 and control circuit 116 determine that the previous source is still active, then the previous source is selected 154. If the stack is tested to determine if it is empty 148 and it is, then the television is set to select its default source, the television 156.

Figure 6:
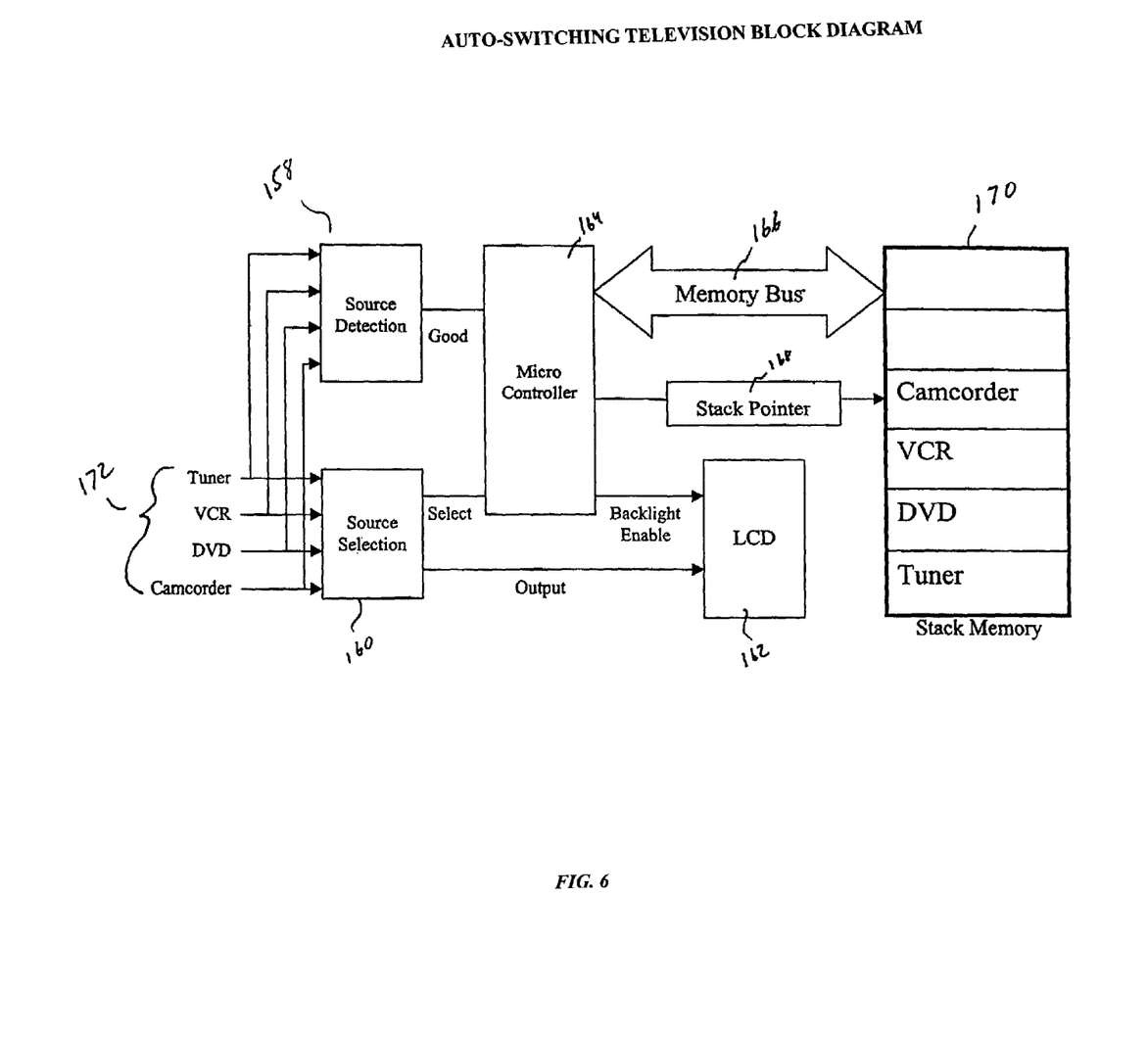
FIG. 6 is a block diagram of an alternative embodiment of the major components of the television of the present invention.

Referring next to FIG. 6, a block diagram of the major portions of the auto-switching television are depicted. Various input sources are depicted in element 172. Source detection 158 includes the hardware and software to perform the operations involved in determining that a new source has been activated or an old source has been de-activated. This includes transition information as well as state information. Transition information is obtained by monitoring for a change in the state of the input signal, as opposed to merely detecting the presence of a video signal. Source selection 160 includes the software and hardware involved in determining which video input source 158 to select upon direction from the micro controller 164. The micro controller also enables the backlight on the liquid crystal display (LCD) 162 or simply activates a traditional tube-based television once the new source has been selected. The micro controller 164 also maintains and controls changes to the stack pointer 168 through the use of the memory bus 166. The contents of an example stack are depicted in element 170 with the stack pointer 168 pointing at the camcorder in the stack 170.

The foregoing description of the preferred embodiment has been made with respect to a television. It will be understood by those of skill in the art that the present invention is not limited to only a television. For example, a stand-alone video display monitor may use the sensing circuits 112 and the control circuit 116 to sense and display video signals. Alternatively, the same sensing circuits 112 and control circuit 116 may be used to automatically select an audio source from among various inputs. The present invention can be used in any instance when a one or more audio or video signals are coupled to a video device.

What is claimed is:

1. A video display device having an automatic input switching capability comprising:
   at least one input connector coupled to the video display device for accepting an external video signal;
   sensing means, including a pixel clock used for detecting an increase in the flow of pixels on said at least one input connector, coupled to said at least one input connector for detecting the presence of said external video signal; said sensing means comprising a sensing circuit including a comparator and a counter coupled to a real time clock; and
   control means coupled to said sensing means and video circuitry of the video display device, wherein said control means controls the operation of the video display device when a new video signal is sensed by said sensing means.

2. The video display device of claim 1, further including a data storage memory, coupled to said sensing means and said video circuitry and acting as a stack for storing the currently-active video signal to which the video display device will automatically return once said external video signal is no longer present.

3. The video display device of claim 1, wherein said pixel clock includes a comparator and a real time clock for detecting an increase in the flow of pixel data to the visual display device in order to detect a new digital signal.

4. The video display device of claim 1, further comprising display means for displaying a picture-in-picture display of said new video signal.

5. The video display device of claim 1, wherein said sensing means comprise a sensing circuit including a comparator.

6. The video display device of claim 1 wherein said sensing means senses a new video signal by determining when a vertical sync signal embedded in said video signal rises from below a value of approximately 10 Hz.

7. The video display device of claim 1 wherein said control means comprise a microprocessor.

8. The video display device of claim 1 wherein said control means and said sensing means are continuously energized.

9. A video display device having an automatic input switching capability, the video display device comprising:
   a power supply;
   a plurality of input connectors coupled to the video display device, each of said input connectors being adapted to accept an external video signal;
   at least one sensing circuit coupled to said power supply and said input connectors for detecting the presence of said external video signal, said sensing circuit at least a comparator, and wherein said sensing circuit detects a presence of a new video signal by sensing when a vertical sync component of said video signal rises above a predetermined threshold level;
   at least one control means coupled to said at lest one sensing circuit and video circuitry of the video display device, wherein said control means controls the operation of the video display device when a new video signal is detected by said sensing circuit; and
   a data storage, accessible by said control means and coupled to said at least one sensing circuit, suitable for storing a last-in-first-out stack used to indicate one or more of said plurality of input connectors which said video display device should display in the order of most recently operating to least recently operating once said new video signal is no longer present.

10. The video display device of claim 9, wherein there are a plurality of sensing circuits, and each of said sensing circuits is coupled to said control circuit and one of said input circuits.

11. The video display device of claim 9 wherein there are a plurality of sensing circuits, and wherein the video display device further comprises multiplexing means coupled to said control circuit, and wherein each of said sensing circuit are coupled to said multiplexing means.

12. The video display device of claim 9, wherein said sensing circuit includes at least a pixel clock for detecting an increase in the flow of pixels in said plurality of input connectors, and wherein said sensing circuit detects the presence of a new video signal by sensing when the number of pixels being sent on a digital signal during a predetermined time increases above a predetermined threshold number.

13. A television having an automatic input switching capability, the television comprising:
   a power supply:
   a plurality of input connectors coupled to the television, each of said input connectors being adapted to accept an external video signal; a plurality of sensing circuits coupled to said power supply and each of said input connectors for detecting the presence or said external video signal, said sensing circuit including at least a comparator, and wherein said sensing circuit detects a presence of a new video signal by sensing when a vertical sync component of said external video signal rises above a value of approximately 10 Hz;
   a control circuit coupled to each of said sensing circuits and video circuitry of the television wherein said control circuit controls the operation of said television when a new external video signal is present on one of said input connectors and is detected by one of said sensing circuits; and
   a data storage-based stack, coupled to said sensing circuits and said control circuit, including sufficient memory allocation to retain references to each of said plurality of input connectors, suitable for storing a group of last-in-first-out references to which said control circuit will refer when selecting which of said plurality of input connectors to display once said new external video signal is no longer present.

* * * * *